Figure 1:
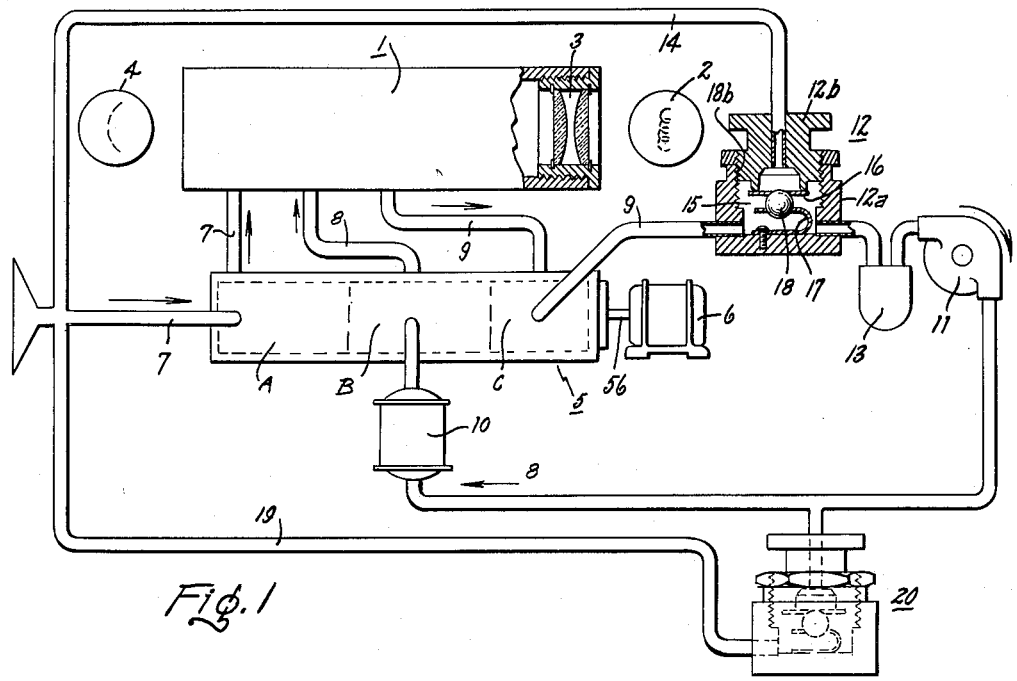

Dec. 5, 1961     E. L. JOHNSON     3,011,387
CONDENSATION NUCLEI DETECTOR
Filed Aug. 29, 1956     2 Sheets-Sheet 1

Inventor
Eugene L. Johnson
by I. David Blumenfeld
His Attorney

Dec. 5, 1961     E. L. JOHNSON     3,011,387
CONDENSATION NUCLEI DETECTOR
Filed Aug. 29, 1956     2 Sheets-Sheet 2
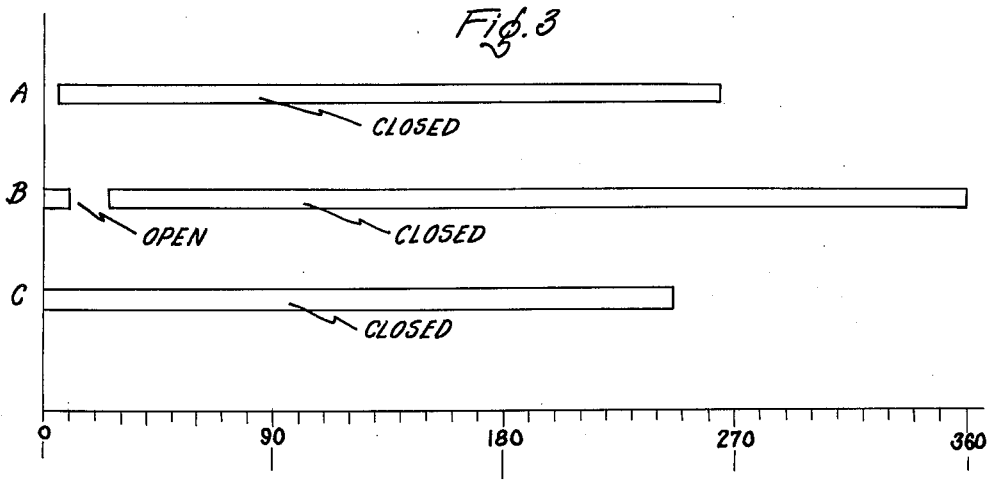
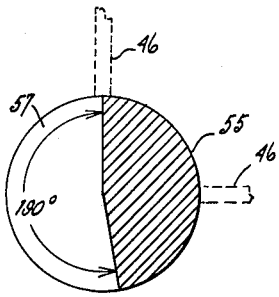
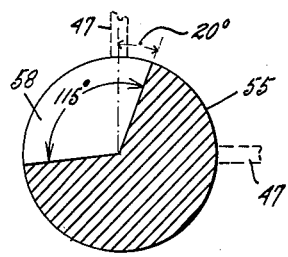
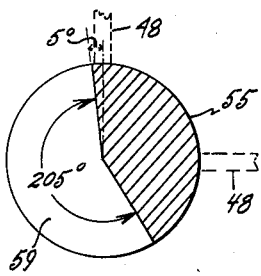
Inventor
Eugene L. Johnson
by J. David Blumenfeld
His Attorney

United States Patent Office 3,011,387
Patented Dec. 5, 1961

3,011,387
CONDENSATION NUCLEI DETECTOR
Eugene L. Johnson, Altamont, N.Y., assignor to General
Electric Company, a corporation of New York
Filed Aug. 29, 1956, Ser. No. 606,911
7 Claims. (Cl. 88—14)

This invention relates to a method and apparatus for measuring small particles, and more specifically to those known as condensation nuclei.

Condensation nuclei is a generic name given to those small particles which are characterized by the fact that they serve as the nucleus on which water, for example, will condense to form droplet clouds. Such condensation nuclei encompass microscopic and sub-miscroscopic particles, the most important segment of the size spectrum lying in a size range extending from approximately $2.5 \times 10^{-7}$ cm. radius, to $1 \times 10^{-5}$ cm. radius.

The nuclei serve as centers about which water droplets form and unless they are present no condensation will generally occur except at remarkable degrees of supersaturation. That is, it has previously been observed that the condensation of water vapor, or the like, does not take place in the absence of such nuclei at values of supersaturation below 400%, a condition which normally does not occur.

The mechanism involved in the condensation of water vapor about such nuclei is dependent both on the relative humidity and on the size of the nuclei. If the humidity of a gas or air mass tends to rise above 100%, as would occur by a sudden cooling, condensation starts the deposition of water on the nuclei to achieve an equilibrium condition. The deposition of water will continue until the humidity is lowered to a new equilibrium condition representing substantially 100% relative humidity for the new temperature. The relationship between relative humidity and particle size which controls the initiation of condensation on small particles or droplets is illustrated by the following table:

| Size: | Relative humidity, percent |
|---|---|
| $10^{-7}$ cm. radius | 350 |
| $10^{-6}$ cm. radius | 112 |
| $10^{-5}$ cm. radius | 101 |
| $10^{-4}$ cm. radius | 100.1 |

An accurate means for measuring the concentrations of condensation nuclei would be extremely useful in meteorological and atmospheric studies, air pollution studies, and investigations of combustion processes. Accordingly, an urgent need exists for an accurate and sensitive means of measuring condensation nuclei.

Due to the minute size of condensation nuclei great difficulty is encountered in their measurement since particles lying in the microscopic and sub-microscopic size ranges must be measured. As a result, the usual techniques involving light absorption and light scattering are of no utility since the condensation nuclei themselves are small relative to the wave length of visible light. As a result, there have been developed techniques for measuring condensation nuclei which rely on their property of acting as the nucleus of a water drop. By causing condensation of water about the nuclei, their size is increased by many orders of magnitude so that the usual techniques may then be utilized in measuring.

The earliest device utilizing this approach for measuring condensation nuclei was the so-called Aitken Counter. In this instrument, the air under test is brought into a chamber lined with a wet blotter. A manually operated piston expands and cools the air raising the relative humidity above 100% causing water to condense about the nuclei. The water drops thus formed are deposited on a square glass slide and are counted with a low power microscope. However, considerable skill and tedious and lengthy operation is required to get consistent results by means of this instrument. Furthermore, the instrument is extremely erratic, and the averaging of many readings is required in order to achieve any sort of accuracy. As a result, this apparatus and method is extremely time consuming and the device is most unsatisfactory for measuring conditions in which the nuclei concentrations are varying rapidly. Thus, the inherent inaccuracy of the Aitken Counter as well as its extremely slow response, makes it a most unsatisfactory device to use.

Some of the major shortcomings of the Aitken Counter are avoided by the Nolan Counter, which is described in Proceedings of the Royal Irish Academy, vol. 51, section A, No. 2 (1946). In this device, the air sample is brought into a closed chamber lined with a wet blotter and traversed by a light beam. The air sample is pressurized by pumping in filtered air, and a quick-acting valve allows expansion of the sample to atmospheric pressure. The resultant expansion causes cooling of the sample and raises the humidity causing water drops to form in the chamber. This cloud of droplets within the chamber causes attenuation of the light beam traversing the chamber. The attenuated light thus provides an indication of the droplet cloud and, consequently, of the number of nuclei present. The Nolan Counter solves several of the difficulties presented by the Aitken Counter in that reproducible readings are obtainable by means of this device, and further the speed of response is greater than that of the Aitken Counter.

The Nolan Counter, however, has several serious shortcomings which limit its utility as a highly accurate and fast instrument. That is, since the Nolan Counter expands the sample to atmospheric pressure, the apparatus is extremely sensitive to variations in atmospheric pressure, since any such variation causes variations in the degree of supersaturation achieved for successive samples.

Furthermore, the Nolan Counter is relatively limited as to the degree of supersaturation obtainable. That is, the only manner in which the expansion ratio, and consequently the degree of supersaturation, can be varied in the Nolan Counter, is by increasing the degree of compression of the sample. By increasing the amount of compression, the amount of heat of compression released during the process is increased. It thus becomes necessary to permit the sample to stand for a period of time prior to expansion, in order that the heat of compression may be dissipated. As a consequence, the speed of response for high supersaturation levels is limited, thus limiting the utility of the device for conditions where the nuclei concentration is varying rapidly. Since the size of particles which may be detected depend on the degree of supersaturation, it can be seen that the Nolan Counter is a relatively slow instrument for detecting concentrations of the smaller condensation nuclei.

Accordingly, it is an object of this invention to provide an apparatus for measuring condensation nuclei which is extremely accurate and has a fast response time.

A further object of this invention is to provide a condensation nuclei measuring apparatus which is less sensitive to atmospheric pressure variations.

Another object of this invention is to provide a condensation nuclei measuring apparatus in which the expansion of the test samples is defined by a pressure differential lying in a range extending on either side of the initial test sample pressure.

Further objects and advantages will appear as the description of the invention proceeds.

In accordance with the invention, a novel condensation nuclei measuring device is disclosed which has a very high order of accuracy and an extremely fast response time and which is mush less sensitive to variations in the initial test sample pressure. The novel apparatus comprises an expansion chamber lined with a wet blotter. The chamber is traversed by a beam of light, the scattering of which will provide a measure of the condensation nuclei. Condensation nuclei containing samples are periodically introduced into the chamber at inlet pressure which may be atmospheric. The samples are subjected to an over-pressure by means of a source of filtered air at a higher pressure. The sample is then expanded by means of a pressure defined expansion to a pressure below the initial inlet pressure which is established between the chamber and a source of vacuum such as a pump. That is, the expansion of the test samples is achieved by means of a pressure differential established through two pressure sinks, one above the initial pressure and the other below the initial pressure.

The admission of the samples into the chamber, the pressurizing thereof, and the expansion to the final pressure is controlled by means of three rotary valves which permit a controlled and very accurate operating cycle. Consequently, a very precisely controlled level of supersaturation of the sample is possible, and a high level of accuracy may be achieved.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

FIGURE 1 shows a view partially in cross-section of the novel apparatus of the invention;

FIGURE 2 is a fragmental perspective partially in cross-section of the expansion chamber and rotary valves of FIGURE 1;

FIGURE 3 is a diagrammatic showing of the positions of the various valves for an operational cycle;

FIGURE 4 is a sectional view of the valve rotor taken along the line 4—4 of FIGURE 2;

FIGURE 5 is a sectional view of the valve rotor taken along the line 5—5 of FIGURE 2;

FIGURE 6 is another sectional view of the valve rotor taken along the line 6—6 of FIGURE 2.

Referring now to FIGURE 1, there is illustrated an embodiment of a condensation nuclei detecting apparatus embodying the instant invention. There is provided an elongated chamber 1 adapted to hold humidified gaseous samples, which may consist of air or other gases, containing condensation nuclei. Gaseous samples are periodically introduced, over-pressurized and expanded in the chamber to form droplet clouds. A beam of radiant energy is provided by an incandescent lamp 2, or any other similar source of radiant energy, positioned adjacent to one end of the chamber 1. The beam of radiant energy from the incandescent lamp 2 traverses the chamber 1 by virtue of an optical system 3 mounted therein, shown in greater detail in FIGURE 2 and to be discussed later in connection therewith. A radiation sensitive device 4, such as a photoelectric or photomultiplier device, is positioned adjacent to the other end of the chamber 1 and functions to intercept any light scattered in the chamber by the periodic formation of droplet clouds therein. The optical system within the chamber is so designed that no light falls on the radiation sensitive device 4 in the absence of a droplet cloud within the chamber. The precise manner in which this may be achieved will be discussed in detail later with reference to FIGURE 2. Upon the appearance of such a droplet cloud, light is scattered within the chamber and caused to fall on the radiation sensitive device 4. Such scattered light falling on the radiation sensitive device 4 produces a periodic electrical signal in its output which may be connected to a measuring or recording instrument, not shown, in order to provide a measure of the number of condensation nuclei present.

In addition, there is provided means for periodically admitting gaseous samples into the chamber 1, pressurizing the samples by subjecting them to over-pressure, and expanding said sample to a lower pressure in order to form droplet clouds within the chamber. To this end, there is provided a valve means 5 consisting of a first valve portion A, a second valve portion B, and a third valve portion C. The valve means 5 is generally of the rotary type and may be seen most clearly with reference to FIGURE 2, and functions, broadly speaking, to control the periodic admission of gaseous samples into the chamber 1, the pressurization of said samples by means of high pressure filtered air, and the subsequent expansion thereof to a value of pressure below the initial inlet pressure to produce droplet clouds. The rotary valve means 5, as will be explained in greater detail later, consists of a bored cylindrical valve body having three pairs of ports extending into the bored portion, and a rotor driven by a motor 6. The rotor of the valve means 5 has a number of recessed portions which are sequentially operative to perform the valving function by aligning with the different pairs of ports.

Rotary valve means A is connected in an input conduit 7 and periodically admits gaseous samples into the chamber 1. These gaseous samples are admitted at a first pressure which, for example, may be atmospheric. The rotary valve means B is connected in a conduit 8 which functions to permit the periodic introduction of filtered air at a pressure higher than that of the inlet pressure so as to raise the pressure of the sample in order to humidify it. The rotary valve means C is connected in an output conduit 9 and permits the periodic expansion of the gaseous samples in the chamber from the over-pressure value to a pressure below the initial inlet pressure in order to form droplet clouds within the chamber.

The output conduit 9 is connected to a pump 11, which may be of the centrifugal type, through a control valve 12 and a water trap 13. The pump 11 provides a source of lower pressure and acts effectively as a low-pressure or vacuum sink. The low pressure sink causes the gaseous samples in the chamber 1 to expand to a lower pressure through the valve means 5 to a level determined by the control valve 12, thus providing a rapid and accurate pressure defined expansion. The control valve 12 is connected to the output conduit 9 and to an input line 14 which is connected to the input conduit 7 and thus is maintained at the sample inlet pressure.

The control valve 12 consists of a main body portion **12*a* adapted to receive an externally threaded male member 12*b* to form a chamber 15. The output conduit 9 extends through the main body portion 12*a* into the chamber 15 while the input line 14 extends through the cooperating male portion 12*b*. Positioned within the chamber of the control valve 12 is a stainless steel ball 18 which is forced against a flapper or ring member 16 which is positioned so as to seal the chamber from the input line 14, by means of a U-shaped spring 17 which is fastened to the main portion 12*a* of the valve 12. The spring force of the U-shaped spring 17 acts against the ball 18 and the ring 16 in opposition to the air pressure force from the line 14. In this manner the pressure differential between the chamber and the pump may be kept at a constant value. The control valve permits air to bleed into the pump line from the input line 14 if the pressure differential reaches a preset value. That is, if the air pressure force reaches a value greater than desired differential, the air pressure in the line 14 becomes sufficiently great to overcome the balancing pressure exerted by the U-shaped spring 17 and stainless steel ball 18 against the ring member 16** and air flows into the pump line and reduces the pressure differential. In this manner, a constant dicerential is maintained.

The amount of spring pressure, and in turn the pressure differential, may be varied by rotating the externally threaded male member **18*b* thereby applying greater or lesser tension to the U-shaped spring 17**.

In utilizing a pressure defined expansion of the gaseous samples, it is vital that a constant pressure differential be maintained since too low a differential would not give the proper degree of expansion and supersaturation required to cause condensation on small nuclei. On the other hand, too high a differential would cause either spontaneous condensation or condensation on charged molecules which causes the desired signal to be masked.

Furthermore, variations in the pressure differential would, of course, introduce ambiguities and errors into successive readings. As a result, a control valve is desirable in order to maintain a constant pressure differential, thus making the system substantially independent of variations in the input pressure of the gaseous sample, particularly if the samples are introduced into the chamber at atmospheric pressure.

The conduit 8 is connected to the high pressure side of the pump 11 which provides, in effect, a high pressure sink. The conduit 8 is connected through a filter element 10 which may be filled with glass wool or other fibrous material in order to remove substantially all naturally occurring condensation nuclei present in the air supplied by the pump 11. The pump 11 thus supplies filtered air at a pressure higher than the inlet pressure of the gaseous sample to the chamber 1. In this manner the gaseous sample in the chamber 1 is pressurized and caused to absorb moisture from a moisture supplying means 60 positioned in the chamber 1, which will be described in greater detail with reference to FIGURE 2.

The conduit 8 is also connected to a control valve 20, identical with valve 12, which is connected to a second input line 19 in order to control the pressure differential applied to the samples in the chamber 1. That is, the over-pressure air supplied to the chamber 1 is maintained at a fixed differential with respect to the input pressure of the sample by means of the valve 20 which, in a manner similar to that described with reference to control valve 12, permits the over-pressure air in conduit 8 to bleed into line 19 if the pressure differential goes beyond a preset value.

A fixed pressure differential is thus always maintained relative to the sample inlet pressure with respect both to the over-pressure and under-pressure supplied by the pump 11. Consequently, since the expansion of the test samples is defined by a pressure differential lying in a range extending on either side of the sample inlet pressure, any variations in the sample inlet pressure will not affect the reading and indication of the detector. Hence, a very precise and accurate expansion of the gas sample in the chamber 1 is achieved providing an instrument of a very high order of accuracy.

The operation of the apparatus of FIGURE 1 may be most clearly understood with reference to FIGURE 3 which shows a diagram of the valve positions for an operational cycle. FIGURE 3 illustrates diagrammatically the operating conditions of each of the valves A, B, and C, during various positions during one operational cycle. The condition of each valve, whether open or closed, is plotted along the ordinate while the angular position of the valve rotor is plotted along the abscissa. These are, of course, arbitrary with respect to a reference point and are intended only to illustrate that one operational cycle encompasses one complete rotation of the valve rotor member through 360°.

The sample to be tested enters the chamber 1 at an initial or inlet pressure which, for example, may be atmospheric pressure. This occurs during the portion of the operational cycle known as the Fill portion. At this time rotary valve A is open and valve C is closed so that the sample flows into the chamber until inlet pressure is reached. During this portion of the cycle valve B is closed. As can be seen most clearly in FIGURE 3, the Fill portion, during which valve A is open and valve C is closed, extends for 5° of the operational cycle. Valve A now closes and valve B remains closed. For the next 5° from 5° to 10° all three valves are closed and the sample in the chamber 1 comes to equilibrium.

The next portion of the operating cycle is denominated as the Pressurizing portion during which the sample in the chamber 1 is pressurized and raised to a second pressure higher than the inlet pressure. During this portion of the cycle the valves A and C remain closed but the valve B opens permitting over-pressure filtered air to enter the chamber through the valve B, the conduit 8, and the filter 10 from the pump 11. As illustrated in FIGURE 3, the valve B opens at the 10° point of the cycle and remains open for the next 15°. During this portion of the operating cycle the pressure in the chamber is raised causing the sample to become humidified by absorbing moisture from a moisture supplying means, such as the wet blotter illustrated in FIGURE 2, positioned in the chamber 1.

The Dwell portion of the cycle then occurs in order to permit the pressurized gaseous sample in the chamber 1 to reach an equilibrium condition both as to temperature and humidity. That is, at the 25° position the valve B closes and the valves A and C, closed previously, remain closed allowing an overlap in the valves. During this Dwell portion of the cycle, the gaseous sample continues to absorb moisture in the chamber until an equilibrium condition is reached for the given temperature and pressure condition in the chamber.

The next portion of the operating cycle is the Expand portion during which the gaseous sample in the chamber is permitted to undergo a pressure defined expansion in order to form a cloud of droplets about the condensation nuclei present in the sample. At the start of the Expand part of the cycle, valve C opens fully and the pump 11 pulls chamber pressure down to a level determined by the pump 11 and the control valve 12. The pressure to which the gaseous sample is reduced during the Expand portion is, in the instant case, a pressure which is below both the initial inlet pressure and the subsequent over-pressure. Thus, the expansion of the sample is defined by a pressure differential lying in a range extending on either side of the initial test sample pressure and as a result the operation of the nuclei detecting apparatus is less sensitive to any variations of the inlet sample pressure which, as has been pointed out, may be atmospheric pressure.

The sudden expansion of the gaseous sample cools the air in the chamber. The amount of water vapor in the sample which was 100% of what could be retained at the former temperature and pressure (i.e., 100% relative humidity) will be more than 100% of what can be retained at the cooler temperature. Thus, a condition of supersaturation exists instantaneously within the chamber. As a result of this supersaturation, water vapor condenses on the condensation nuclei to produce droplet clouds. The light passing through the chamber 1 is scattered by the droplet cloud so that a portion of it reaches the radiation sensitive device 4 which is otherwise unilluminated. As a result, an electrical signal is produced in the output of the radiation sensitive device 4 once per operational cycle. This electrical signal provides a measure of the number of nuclei present, since the amount of scattering of the light is dependent on the number of nuclei about which droplets are formed.

After the Expand portion a period covering a range from 245° to 265° of the rotor angular displacement, the Flush portion of the cycle is initiated. That is, valve A reopens at the 265° point in order to remove the sample from the chamber. The opening of valve A causes the pressure in the chamber to rise to inlet pressure and consequently the temperature therein rises and the droplets evaporate. Since both valves A and C are now open, the pump 11 draws the previous sample out of the chamber and also admits the fresh sample into the chamber. In order to make certain that the previous sample is completely removed from the chamber, so as to remove any possibility of contamination of the subsequent sample, the Flush cycle extends from the 265° position of the valve rotor until the end of the cycle, or for 95° of the cycle as is clearly illustrated in FIGURE 3.

The next cycle now commences with the closing of valve C which initiates the Fill portion and the action previously described may be repeated at any desired repetition frequency, which in turn controls the output frequency of the electrical signal produced by radiation sensitive device 4. That is, the motor 6 driving the rotor of the valve means 5 may, for example, have a speed of 5 revolutions per second, thus producing a 5 cycle per second frequency. It is obvious, of course, that the cycle frequency just described is a matter of choice and convenience and that other cycle frequencies may be utilized without departing from the spirit of the instant invention.

As was pointed out with reference to FIGURE 1, the expansion chamber in conjunction with the rotary valve means constitutes a means by which gaseous samples are periodically drawn into the apparatus at one pressure, pressurized to a second higher pressure, and then subjected to expansion in order to produce detectable droplet clouds.

Figure 2:
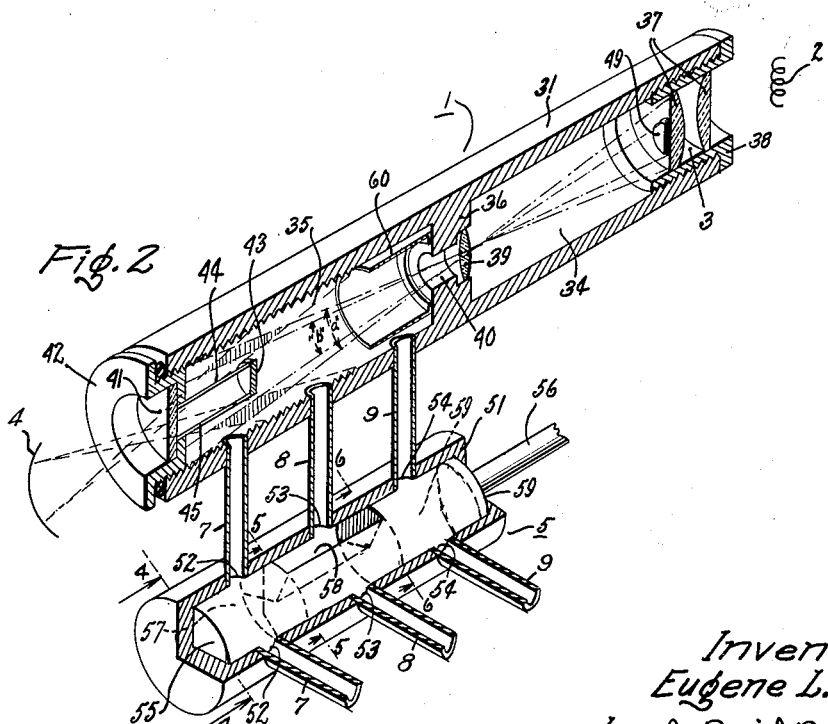

FIGURE 2 illustrates, in detail, a preferred embodiment of an expansion chamber and rotary valve means which may be utilized in the apparatus of FIGURE 1. There is provided a cylindrical chamber 31 having a source of radiant energy, such as the incandescent lamp 2, positioned adjacent to one end thereof. Mounted adjacent the other end of the chamber 31 is a radiation sensitive device 4 of the type disclosed and described with reference to FIGURE 1. The chamber 31 consists of two chamber portions 34 and 35 separated by means of a divider wall 36 having an elongated cylindrical passage 40 therein. The chambr portion 35 comprises the cloud forming chamber wherein the gaseous samples are pressurized and expanded to form droplet clouds. An input conduit 7 is provided for admitting the samples to the chamber. A conduit 8 admits filtered pressurized air into the chamber 35 in order to subject the samples to overpressure and humidify them. An output conduit 9 is provided for subjecting the samples to expansion by means of a pump such as is illustrated in FIGURE 1.

Mounted within the chamber 31 is an optical system which functions to project the beam of radiant energy through the chamber in such a manner that light falls on the radiation sensitive device only if a droplet cloud is present in the cloud chamber 35 to scatter the light. A pair of condensing lenses 37 is positioned at one end of the chamber 31 in a threaded lens mount 38. The condensing lenses 37 are positioned adjacent to the incandescent lamp 2 and function to focus the beam of light and image it at the divider wall 36. A divider lens 39 is positioned within the divider wall 36 and projects the beam of light which has been focused thereon through the cylindrical passageway 40 and into the cloud forming chamber 35. Since the light from the incandescent source 2 is focused at the divider lens 39, the divider lens acts effectively like a source positioned at this point of the chamber. Thus, there is produced within the cloud chamber 35 a cone of light subtending an angle "*a*" as shown in FIGURE 2.

Positioned at the other end of the chamber 31 and adjacent to the radiation sensitive device 4 is a transparent window 41 positioned within a threaded mounting 42 and directly in front of the radiation sensitive device 4. In order that only light scattered by droplets within the cloud chamber 35 impinge upon the radiation sensitive device 4 and nonimpinge thereon in the absence of droplets, an opaque light barrier 43 of circular configuration is positioned in front on the window 41 in order to block any direct light path from the divider lens 39. The light barrier 43 is fastened to the mounting member 42 by means of struts 44 and 45.

In order to prevent stray light due to multiple reflections of the incoming rays from affecting the radiation sensitive device 4, the interior surface of the cloud chamber 35 in the vicinity of the window 41 is threaded in order to absorb such reflected light by multiple reflections from the threaded portions. In addition, the end of the chamber 35 adjacent to the radiation sensitive element may be painted black or covered with black velvet in order to minimize further any stray reflected light.

If a cone of light subtending the angle "*a*" were projected toward the window 41 and its attendant light barrier 43, it is possible that some of the rays may strike the edge of the barrier and be diffracted towards the window 41 and would thus contribute to an erroneous and inaccurate reading. In order to avoid such a possibility, it is desirable to provide a cone of darkness, subtending an angle "*b*," within the cone of light. To this end, there is provided an opaque circular disc 49 positioned on the face of one of the condensing lenses 37. In this fashion there is produced a cone of darkness within the cone of light, the angle "*b*" subtended by the cone of darkness being such than the edge of the light barrier 43 is kept dark. As a result, only the light in the angular volume which is illuminated by rays in the cone of light and which is in the sight of the radiation sensitive device is effective in producing a scattered light signal. This angular volume is illustrated in FIGURE 2 by means of the dappled portion. As a result, the radiation sensitive device 4 intercepts a substantial port of the light scattered by droplet clouds in the forward direction to provide a very sensitive means for measuring the number of droplets within the cloud forming chamber 35.

A moisture supplying means for humidifying the gaseous samples is positioned within the cloud chamber 35. A moistened blotter 60, or similar material, such as moistened linen, lining the chamber wall is provided for this purpose. In addition, there is provided a moisture supply tank, not shown, in order to maintain an adequate supply of moisture within the cloud chamber 35.

A rotary valve means 5 is provided in order to control the admission of gaseous samples into the cloud forming chamber 35 and the pressurization and subsequent expansion thereof. The valve means 5 consists of a valve body 51 having a cylindrical bored portion therein. The input conduit 7 extends through the valve body 51 to form a first pair of ports 52 extending into the bore and positioned at an angle of 90° relative to each other. The over-pressure conduit 8 similarly extends through the valve body 51 into the bore to provide a second and similar pair of ports 53. In a similar fashion, the output conduit 9 extends into the bore portion of the valve body 51 to provide a third pair of ports 54 similarly positioned at an angle of 90°. Positioned within the cylindrical bore of the valve body 51 is a rotary member 55 fastened to a shaft 56 driven by a motor, not shown, such as is illustrated in FIGURE 1.

The rotor 55 has a first circumferentially extending recessed portion 57 which is alignable with the first pair of ports 52 upon rotation of the rotor member. The recessed portion 57 permits flow of gaseous samples into the cloud chamber 35 through the input conduit 46 when the recessed portion 57 is in alignment with the ports 52. The recessed portion 57 is of substantial width, and in a preferred embodiment, subtends an angle of approximately 190°, as may be seen most clearly in FIGURE 4, which is a section taken long the line 4—4 of FIGURE 2.

Axially displaced from the recessed portion 57 is a second recessed portion 58 controlling the flow of the filtered over-pressure air through the conduit 8 into the chamber to permit the pressurizing of the sample. This second recessed portion consists of a relatively wide circumferentially extending recessed section 58 and functions to permit the flow of the filtered pressurized air into the cloud chamber through the conduit 8 when the recessed portion 58 is in alignment with the ports 53. As may be seen most clearly with reference to FIGURE 5, the recessed portion, in a preferred embodiment, subtends an angle of approximately 115° and lags the recessed portion 57 by 20°.

A third recessed portion 59, displaced axially from the recessed portions 57 and 58, is alignable with the third pair of ports 54 and functions to permit the expansion of the gaseous samples in the chamber when the recessed portion 59 is in alignment with the ports 54. The magnitude of the recessed portion 59 may be most clearly seen with reference to FIGURE 6, which is a section taken along the lines 6—6 of FIGURE 3, and subtends an angle of approximately 205° and leads the recessed portion 57 by 5°.

The recessed portions 57, 58, and 59 are so positioned around the circumference of the rotor body 55 that they are in alignment with their respective ports 52, 53, and 54 during different portions of the cycle. The precise relationship of the recessed portions can be most clearly seen in FIGURES 4, 5 and 6 which illustrate the relative angular dimensions and relative circumferential positions of the recessed portions of the rotor body 55. By means of such a construction of the valve rotor 55 the operating cycle illustrated in FIGURE 3 of this application may be achieved.

Although a rotary valve embodying but a single rotor member having separate recessed portions is disclosed in order to control flow through the conduits, it is obvious, of course, that three separate rotary valves may be utilized without going outside of the spirit of the instant invention. Although certain configurations of the recessed portions are illustrated, it is also quite possible to utilize configurations of many different types. Similarly, many other types of valves may be utilized, as for example, solenoid valves.

Furthermore, although the preferred embodiment illustrated in FIGURES 1 and 2 discloses a moisture supplying means for the gaseous samples positioned within the cloud chamber 35, it is obvious that the samples brought into the cloud chamber may be pre-humidified thus avoiding the necessity for placing a wet blotter within the chamber. That is, it would be possible to place a pre-humidifier in the conduit 7 of FIGURE 2 by means of which the samples entering the chamber 35 would be humidified. Should such a pre-humidifier be utilized it might be desirable to provide a drier element in the filtered air conduit 8 of FIGURE 1. Such a drier would only be necessary if an appreciable temperature differential exists between the air in the cloud chamber and the filtered air being applied thereto.

While a particular embodiment of this invention has been shown it will, of course, be understood that it is not limited thereto since many modifications both in the arrangement and in the instrumentalities employed may be made. It is contemplated by the appended claims to cover any such modifications as fall within the true spirit and scope of this invention.

What I claim as new and desire to secure by Letters Patent of the United States is:

1. In a condensation nuclei detecting apparatus the combination comprising a chamber means adapted to hold nuclei bearing humidified gaseous samples at a first pressure, first means including a positive valve means coupled to said chamber means for periodically applying a filtered gas at a higher pressure to said chamber, second means coupled to said chamber and including a positive valve means to expand said samples periodically and reduce their pressure below said first pressure whereby condensation takes place about the nuclei to produce a droplet cloud, and means operatively associated with said chamber for measuring the density of the resulting droplet cloud in said chamber as an indication of the nuclei concentration.

2. In a condensation nuclei detecting apparatus the combination comprising chamber means adapted to hold nuclei bearing gaseous samples, said chamber means including a moisture supplying means associated with said chamber to humidify said samples, means coupled to said chamber means to produce droplet clouds therein including a first positive valve means to permit said samples to be drawn into said chamber means periodically at a first pressure, means coupled to said chamber to bring said samples to a higher pressure including a second positive valve means for periodically applying filtered gas at a higher pressure to said chamber, and further means also coupled to said chamber means to permit said samples to be expanded periodically and reduce to a pressure below said first pressure including a third positive valve means, means to produce a beam of radiant energy traversing said chamber which is periodically scattered by said droplet clouds, radiation sensitive means positioned adjacent to said chamber means to intercept said scattered radiant energy to produce periodic electrical signals as a measure of the number of nuclei.

3. In a condensation nuclei detecting apparatus, the combination comprising a chamber adapted to hold nuclei bearing gaseous samples, and moisture supplying means positioned in said chamber, means coupled to said chamber to produce droplet clouds periodically within said chamber about any nuclei present in said samples, said last named means including a first positive valve means to permit samples to be drawn periodically into said chamber at a first pressure, means to raise the pressure of said samples above said first pressure including second positive valve means adapted to communicate periodically between said chamber and a source of high pressure filtered gas, means coupled to said chamber to expand said samples periodically and reduce their pressure below said first pressure including third positive valve means, means positioned adjacent to said chamber to produce a beam of radiant energy traversing said chamber which is periodically scattered by said droplet cloud, radiation sensitive means also positioned adjacent to said chamber to intercept said scattered radiant energy to produce periodic electrical signals as a measure of the number of nuclei.

4. In a condensation nuclei detecting apparatus, the combination comprising a chamber having inlet and outlet means for holding nuclei containing gaseous samples including moisture supplying means positioned within said chamber, means to produce droplet clouds periodically within said chamber about any nuclei present, said means including a first positive valve means positioned in said inlet means to permit said samples to be drawn periodically into said chamber at a first value of pressure, means coupled to said outlet means to apply filtered gas at a higher pressure to said chamber to raise the pressure of said samples to a second value whereby said sample is humidified said last named means including a second positive valve means positioned in said outlet means, and further means coupled to said outlet means including a third positive valve means to permit said samples to be expanded periodically to lower the pressure of said samples to a third value below said first and second values, means operatively associated with said chamber to provide a beam of radiant energy traversing said chamber which is periodically scattered by said droplet cloud, radiation sensitive means positioned to intercept said scattered radiant energy to produce periodic electrical signals as a measure of the number of nuclei.

5. In a condensation nuclei detecting apparatus, the combination comprising a chamber means adapted to hold gaseous nuclei bearing samples at a first pressure, said chamber means including a moisture storing means for humidifying said samples, first means coupled to said chamber including a first rotary valve operated periodically to permit said samples to be drawn into said chamber at a first pressure, means coupled to said chamber means for periodically applying filtered gas at a higher pressure to said chamber means and including a second rotary valve, means including a third rotary valve coupled to said chamber to expand said samples and reduce the pressure below said first pressure whereby condensation takes place about the nuclei to produce the droplet cloud, common driving means for said first, second, and third valves, and means operatively associated with said chamber means for producing an indication of the density of the resultant droplet cloud in said chamber as a measure of the nuclei concentration.

6. In a condensation nuclei detecting apparatus, the combination comprising a chamber means adapted to hold gaseous samples containing condensation nuclei at a first given pressure, said chamber means including moisture supplying means for said samples, means coupled to said chamber means for periodically admitting, pressurizing and expanding samples in said chamber to produce droplet clouds therein, said last named means including a valve means having a body portion with a cylindrical bored portion, first, second and third pairs of ports extending into said bored portion, a rotary member mounted within said bored portion having a first recessed portion alignable with said first pair of ports to permit samples to be admitted into said chamber at a first pressure, a second recessed portion alignable with said second pair of ports to couple said chamber to a source of filtered gas at a higher pressure to permit said sample to be pressurized to raise the pressure of said samples above said first pressure, and a third recessed portion alignable with said third pair of ports to permit expansion of said sample to a pressure below said first pressure whereby condensation takes place about the nuclei to produce a droplet cloud, means positioned adjacent to said chamber means to produce a beam of radiant energy traversing said chamber which is periodically scattered by said droplet cloud, and radiation sensitive means positioned adjacent to said chamber means to intercept said scattered radiant energy to produce periodic electrical signals as a measure of the condensation nuclei.

7. In a condensation nuclei detecting and measuring apparatus, the combination comprising a chamber adapted to hold nuclei bearing gaseous samples at a first pressure, a pair of pressure sinks maintained respectively at pressures above and below said first pressure, means to couple individual ones of said pressure sinks to said chamber sequentially to apply filtered gas from one of said pressure sinks to raise the pressure of said samples above said first pressure and then reduce the pressure below said first pressure to form droplet clouds about nuclei, and means operatively associated with said chamber to measure the density of said droplet cloud as an index of the nuclei concentration.

References Cited in the file of this patent

UNITED STATES PATENTS

| | | |
|---|---|---|
| 1,937,721 | Simon | Dec. 5, 1933 |
| 1,969,626 | Simon | Aug. 7, 1934 |
| 1,971,443 | Exton | Aug. 28, 1934 |
| 2,032,746 | Grant | Mar. 3, 1936 |
| 2,299,457 | Cahusac | Oct. 20, 1942 |
| 2,620,385 | Grant | Dec. 2, 1952 |
| 2,684,008 | Vonnegut | July 20, 1954 |

FOREIGN PATENTS

| | | |
|---|---|---|
| 406,648 | Great Britain | Feb. 26, 1934 |

OTHER REFERENCES

Cloud Chamber for Counting Nuclei in Aerosols, by Bernard G. Saunders, Review of Scientific Instruments, vol. 27, No. 5, May 1956.